(12) United States Patent
Gutteridge (10) Patent No.: US 9,845,856 B2
(45) Date of Patent: Dec. 19, 2017

(54) POWERTRAIN FOR A ROAD CLEANING VEHICLE

(71) Applicant: Johnston Sweepers Limited, Dorking, Surrey (GB)

(72) Inventor: Ross Gutteridge, Greater London (GB)

(73) Assignee: Johnston Sweepers Limited, Dorking, Surrey (GB)

( * ) Notice: Subject to any disclaimer, the term of this patent is extended or adjusted under 35 U.S.C. 154(b) by 0 days.

(21) Appl. No.: 15/123,035

(22) PCT Filed: Feb. 18, 2015

(86) PCT No.: PCT/GB2015/050457
§ 371 (c)(1),
(2) Date: Sep. 1, 2016

(87) PCT Pub. No.: WO2015/132558
PCT Pub. Date: Sep. 11, 2015

(65) Prior Publication Data
US 2017/0082184 A1    Mar. 23, 2017

(30) Foreign Application Priority Data
Mar. 4, 2014    (GB) .................................. 1403783.2

(51) Int. Cl.
*B60K 25/06*    (2006.01)
*F16H 47/02*    (2006.01)
(Continued)

(52) U.S. Cl.
CPC ............. *F16H 47/02* (2013.01); *B60K 17/10* (2013.01); *B60K 17/28* (2013.01); *E01H 1/0854* (2013.01);
(Continued)

(58) Field of Classification Search
CPC ..... B60K 25/06; E01H 1/053; B60Y 2200/14; Y10T 74/19014
(Continued)

(56) References Cited

U.S. PATENT DOCUMENTS 3,649,981 A  *  3/1972  Woodworth .............. E01H 1/04
                                                                15/83
3,761,988 A  *  10/1973  Overton .................. E01H 1/047
                                                                15/83
(Continued)

FOREIGN PATENT DOCUMENTS

DE    1909414 A1    9/1970
DE    2731958 A1    1/1978
(Continued)

*Primary Examiner* — Toan To
(74) *Attorney, Agent, or Firm* — Gable Gotwals (57) ABSTRACT

This invention is directed toward a powertrain for a road cleaning vehicle. In particular, the powertrain includes a hydrostatic gearbox (34) having a casing (50) for directing power from a primary gearbox to a drivetrain and/or one or more road cleaning tools. The casing (50) comprises first and second sections (51, 52) and a plurality of passageways (107, 107) defined by the edges of both the first and second sections (51, 52). An input shaft is provided having an integral gear extending orthogonally therefrom and having an outer portion extending outside of the internal volume of the casing.

20 Claims, 9 Drawing Sheets

(51) Int. Cl.
*B60K 17/10* (2006.01)
*F16H 57/021* (2012.01)
*B60K 17/28* (2006.01)
*E01H 1/08* (2006.01)
*F16H 57/02* (2012.01)

(52) U.S. Cl.
CPC ..... *F16H 57/021* (2013.01); *F16H 2047/025* (2013.01); *F16H 2057/02008* (2013.01)

(58) Field of Classification Search
USPC ....... 15/78; 180/53.1, 53.4, 53.5, 53.6, 69.6, 180/305, 306
See application file for complete search history.

(56) References Cited

U.S. PATENT DOCUMENTS

| | | | | |
|---|---|---|---|---|
| 3,887,959 A * | 6/1975 | Matsuo | ................... | A47L 11/24 15/347 |
| 4,160,302 A * | 7/1979 | Hirst | ................... | E01H 1/056 15/340.3 |
| 4,319,500 A * | 3/1982 | Horn | ................... | B60K 17/04 74/358 |
| 4,773,119 A * | 9/1988 | Duthie | ................... | E01H 1/0827 15/340.1 |
| 4,779,303 A * | 10/1988 | Duthie | ................... | E01H 1/0827 15/326 |
| 4,986,073 A | 1/1991 | Okada | | |
| 5,054,152 A * | 10/1991 | Hulicsko | ................... | B60G 9/00 15/84 |
| 5,156,576 A | 10/1992 | Johnson | | |
| 5,373,697 A | 12/1994 | Jolliff et al. | | |
| 5,394,699 A | 3/1995 | Matsufuji | | |
| 5,901,409 A * | 5/1999 | Schick | ................... | E01H 1/0827 15/340.3 |
| 6,547,685 B2 * | 4/2003 | Kawada | ................... | B62D 11/18 475/23 |
| 8,051,529 B2 * | 11/2011 | Shea | ................... | E01H 1/103 134/103.3 |
| 9,010,467 B2 * | 4/2015 | Burnier | ................... | B60K 25/06 180/53.1 |
| 2002/0166402 A1 | 11/2002 | Bennett et al. | | |
| 2003/0070848 A1 * | 4/2003 | Hasegawa | ................... | B60K 17/06 180/53.1 |
| 2005/0155170 A1 * | 7/2005 | Charky | ................... | B60K 5/08 15/78 |
| 2007/0017729 A1 * | 1/2007 | Nishimoto | ................... | B60K 17/08 180/374 |
| 2008/0216878 A1 * | 9/2008 | Shea | ................... | E01H 1/103 134/198 |
| 2009/0300870 A1 * | 12/2009 | Riach | ................... | A47L 9/1608 15/320 |
| 2010/0011523 A1 * | 1/2010 | Larkowski | ................... | E01H 1/0845 15/78 |
| 2010/0056327 A1 * | 3/2010 | Hofbauer | ................... | B60K 5/08 477/5 |
| 2013/0239559 A1 * | 9/2013 | Ishikawa | ................... | B60K 6/12 60/414 |
| 2016/0076633 A1 * | 3/2016 | Nellums | ................... | B60K 17/10 74/732.1 |
| 2017/0016453 A1 * | 1/2017 | Knopp | ................... | F04D 29/422 |

FOREIGN PATENT DOCUMENTS

| | | |
|---|---|---|
| DE | 102008004337 A1 | 10/2008 |
| EP | 0347142 A1 | 12/1989 |
| GB | 1479184 A | 7/1977 |

* cited by examiner

POWERTRAIN FOR A ROAD CLEANING VEHICLE

CROSS-REFERENCE TO RELATED APPLICATIONS

This United States application is the National Phase of PCT Application No. PCT/GB2015/050457 filed 18 Feb. 2015, which claims priority to British Patent Application No. 1403783.2 filed 4 Mar. 2014, each of which is incorporated herein by reference.

This invention is directed towards a powertrain for a road cleaning vehicle. In particular, the powertrain comprises a hydrostatic gearbox having a split casing for directing power from a primary gearbox to a driveline and/or one or more road cleaning tools.

Figure 1:
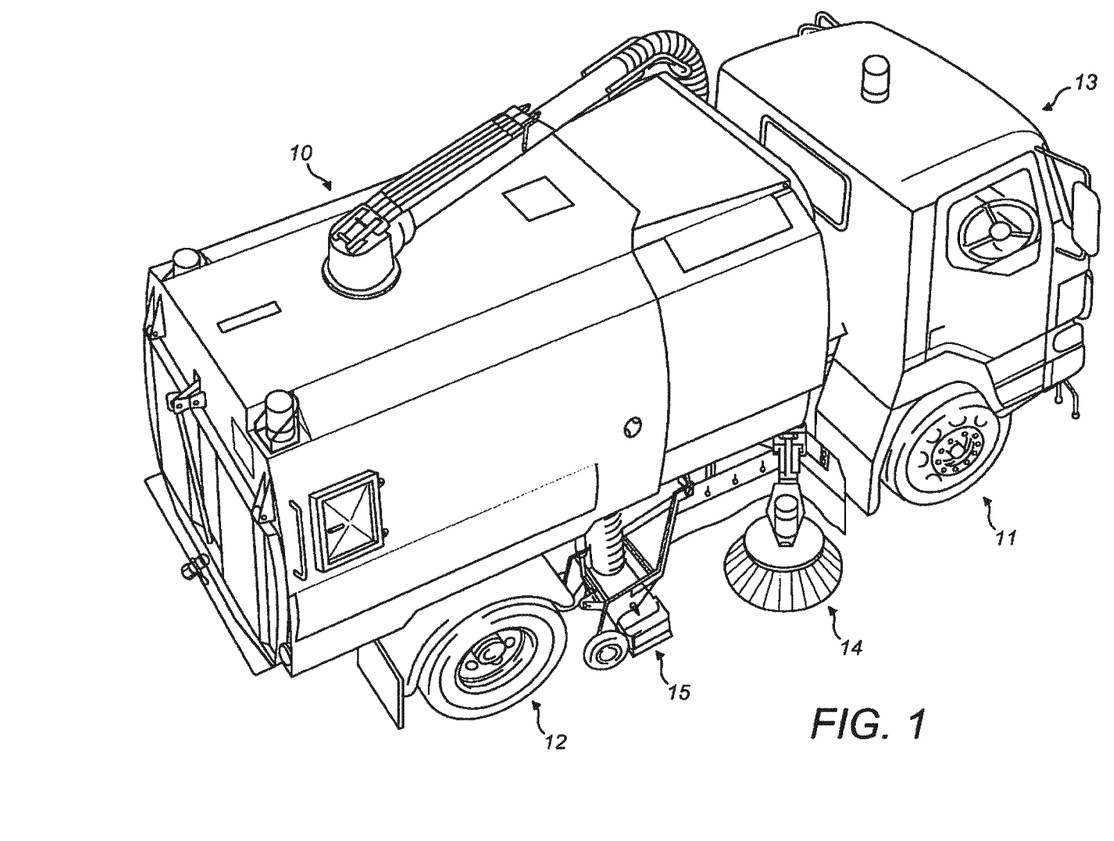
FIG. 1 is a perspective view of a typical road cleaning machine of the prior art.

Road cleaning machines (also known as sweepers) are commonly used to remove unwanted debris from streets. A typical road cleaning machine 10 is shown in FIG. 1, which in this instance is a four-wheeled truck mounted sweeper 10 in the form of a driver operated vehicle having a front axle and corresponding wheels 11 and a rear axle and corresponding wheels 12. An operator control station 13 is located towards the front of the vehicle, under which there is provided cleaning tools, such as cleaning brushes 14 and debris collection means 15.

Road cleaning machines 10 conventionally have two selectable modes of operation: a work mode and a transit mode. In the work mode, the machine 10 performs its cleaning function, travelling slowly and usually limited to low speeds, for example up to 15 km/hr. In the transit mode, the machine 10 may be travelling to a place of work or to a place for disposal of the collected debris; speeds in this mode could be up to 40 km/hr, most often travelling alongside and in amongst other road users, and the cleaning functions are automatically inert in this mode. The function of the cleaning and collection means is only operable when the machine 10 is set in the work mode.

The powertrain of such road cleaning machines 10 is arranged such that power is either provided only to the wheels 11, 12 in the transit mode or provided to both the wheels 11, 12 and work tools in the work mode. Hydrostatic gearboxes are commonly utilised in such powertrains, particularly in powertrains of truck mounted sweepers, to selectively split the power between the wheels 11, 12 and work tools.

Figure 2:
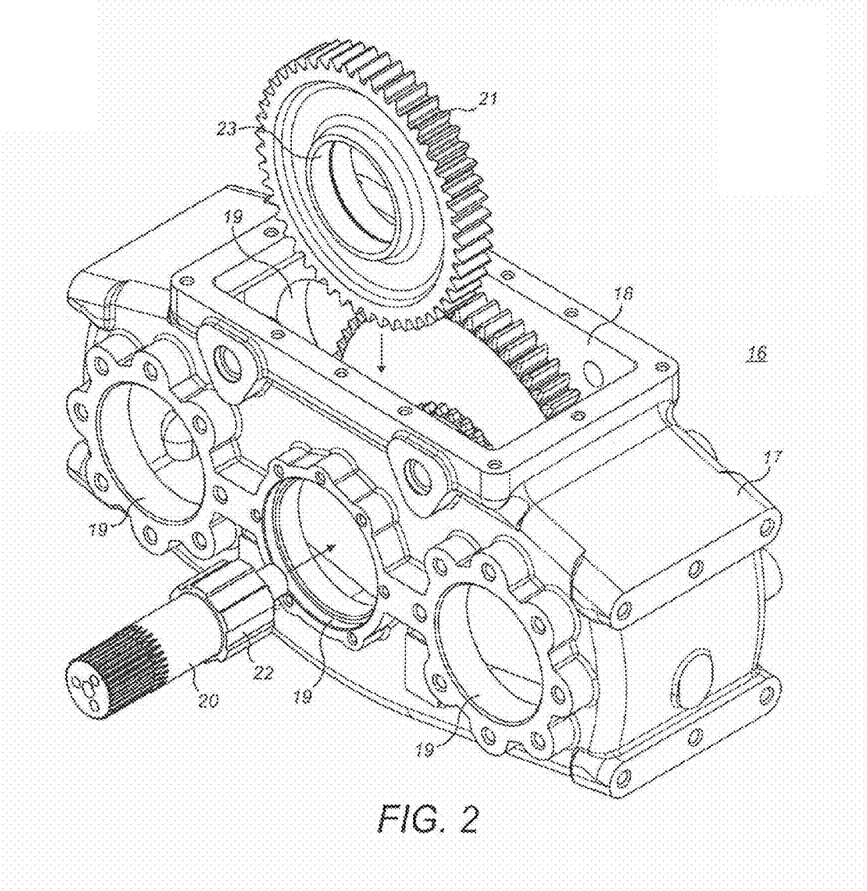
FIG. 2 is a perspective view of a hydrostatic gearbox of the prior art showing the steps of assembly of an input shaft and a gear.

As illustrated in FIG. 2, an exemplary hydrostatic gearbox 16 of the prior art comprises a unitary casing 17 having a top opening 18. The casing 17 comprises a plurality of passageways 19 through which a plurality of shafts extend (not shown). FIG. 2 illustrates the steps of assembling an input shaft 20 with a gear 21, in which the gear 21 is initially inserted into the casing 17 via the top opening 18. The input shaft 20 is inserted through the passageway 19 and a parallel key spline 22 mates with a corresponding spline in the hole 23 of the gear 21.

Such an arrangement has been in use for many years because the casing 17 is easily sealable and is able to withstand forces transmitted orthogonally from the multiple shafts when at high torques. However, the torque that can be transmitted through the hydrostatic gearbox 16 is limited by the mating between the gear 21 and input shaft 20. If the torque transmitted is too high, the gear 21 and input shaft 20 will break apart.

The invention therefore provides a powertrain for a road sweeping vehicle comprising: a power unit operably connected to a primary gearbox; and a hydrostatic gearbox comprising: a casing having an internal volume and comprising first and second sections and a plurality of passageways, wherein the first and second sections each comprise walls having edges, the first and second sections being fastened together at the edges, and each passageway extends through the walls and is defined by the edges of both the first and second sections; an input shaft having an integral gear extending orthogonally therefrom and having an outer portion extending outside of the internal volume of the casing; an output shaft selectively engageable with the input shaft; a pump drive shaft operable to be driven by the input shaft gear; and a motor driven shaft operable to drive the output shaft, wherein the shafts extend within the casing and are each mounted in one of the passageways, said powertrain further comprising: a first mounting arrangement connected to the output of the primary gearbox and located on the outer portion of the input shaft; a second mounting arrangement connected to a drivetrain and located on the output shaft; a hydraulic motor drivably connected to the motor driven shaft; and at least one hydraulic pump drivably connected to the pump drive shaft and hydraulically connected to one or more road cleaning tools and/or the hydraulic motor.

As the input shaft has an integral gear, the torque transmitted through the hydrostatic gearbox can be significantly higher than in the prior art systems. In particular, certain embodiments of the hydrostatic gearbox are capable of receiving, i.e. rated to, an input torque of 14,000 to 16,000 Nm. Preferably the hydrostatic gearbox is rated to at least 10,000 Nm.

It would not be possible to insert a unitary input shaft and gear into the prior art systems with a unitary casing because they are too compact. In the present invention each passageway periphery is formed by the edges of both the first and second sections. Therefore during assembly the unitary input shaft and gear can be initially placed onto one section and the other section mounted thereon.

Preferably the edges of the first and second sections lie in the same plane as the axes about which the shafts rotate.

In a preferred embodiment the shafts are each mounted in at least one bearing in at least one of the plurality of passageways.

Preferably a first hydraulic pump connected to the pump drive shaft is hydraulically connected to the hydraulic motor and a second hydraulic pump connected to the pump drive shaft is hydraulically connected to the one or more road cleaning tools.

Therefore, the first and second pumps can be independently adjusted to provide different amounts of hydraulic fluid to the hydraulic motor and to the road cleaning tools.

In a preferred embodiment the first mounting arrangement is located on an external spline of the input shaft portion extending from the inside of the casing.

The engagement of splines enables easy assembly whilst providing a sufficiently strong engagement to prevent the input shaft and first mounting arrangement from breaking apart.

Preferably the output shaft has an integral gear extending orthogonally therefrom inside the casing and has an outer portion extending outside of the internal volume of the casing; the second mounting arrangement is mounted onto the output portion of the output shaft; and the motor driven shaft is operable to drive the output shaft gear.

In a similar manner to the unitary input shaft and gear, the unitary output shaft and gear are able to transmit higher torques out of the gearbox than in prior art systems in which separate output shafts and gears are mounted together.

Preferably the second mounting arrangement is located on an external spline of the outer portion of the output shaft.

Further preferably, the hydraulic motor and/or at least one hydraulic pump are located on internal splines of the motor driven shaft and/or the pump drive shaft.

In a preferred embodiment the hydrostatic gearbox comprises a first gear selector arrangement for selectively engaging the input and output shafts.

Therefore, the input and output shafts can be disengaged when the machine is in its work mode and engaged when in its transit mode.

Preferably, the first gear selector comprises: an actuator mounted to the outside of the casing; a piston rod extending into the casing from the actuators; and a selector arm connected to the piston rods and engaged with a first clutch, wherein the first clutch is arranged to selectively engage the input and output shafts together.

Preferably the hydrostatic gearbox comprises a second gear selector for selectively engaging the pump drive shaft with the input shaft gear.

Therefore, the pump drive shaft and input shaft can be disengaged when the machine is in its transit mode and engaged when in its work mode. This arrangement is preferred to prior art systems in which the input shaft is continuously engaged with the pump drive shaft and the output shaft is selectively engageable with the motor driven shaft. Such prior art systems are liable to jump out of engagement when a high torque is transmitted from the drivetrain back into the hydrostatic gearbox.

Preferably the second gear selector comprises: an actuator mounted to the outside of the casing; a piston rod extending into the casing from the actuators; and a selector arm connected to the piston rods and engaged with a second clutch, wherein the second clutch is arranged to selectively engage the input and pump drive shafts together.

In a preferred embodiment the first and/or second gear selector arrangements each comprise a first and a second magnetic field sensor and the piston rod(s) comprise a magnetic element, the first and second magnetic field sensors being arranged to detect the movement of the magnetic element such that the position of the piston rod(s) can be determined.

Such an arrangement has been found to be sufficiently durable over the repetitive movement of the piston rods. Reed switches were found to be particularly suitable magnetic field sensors, which the inventors found to be surprising since they are usually only suitable for detecting relatively small movements. The present disclosure further provides such a selector arrangement for use with prior art hydrostatic gearboxes.

In a preferred embodiment the hydrostatic gearbox comprises a hydraulic fluid filter housing mounted to the casing and arranged to cooperate with a hydraulic fluid filter, such that hydraulic fluid circulates between the filter and at least one hydraulic circuit to which the at least one hydraulic pumps are fluidly connected.

In prior art systems the hydraulic fluid filter is mounted to one of the hydraulic pumps, as this is where the hydraulic fluid is. By mounting it on the casing instead, fouling of the filter is reduced and it is easier to access for maintenance/replacement.

Preferably the hydraulic fluid filter housing further comprises an oil passageway in fluid communication with the internal volume of the casing and an oil level sensor.

Such an arrangement provides an extremely compact arrangement and reduces the part count, thereby reducing costs and assembly times.

Further preferably the hydraulic fluid filter housing is mounted over one of the passageways in which a shaft is mounted such that oil is communicated through that passageway from within the casing to the oil level sensor.

As the oil can pass through the passageway in which a shaft, preferably the motor driven shaft, is mounted, a further bore through the casing is not required. The inventors were surprised to find that there was a sufficient flow of oil through the small spacing between the shaft, bearing and passageway to provide an accurate reading of the oil level.

Preferably an input velocity sensor is mounted to the outside of the casing and is arranged to detect the velocity of rotation of the first mounting arrangement and/or input shaft.

Further preferably an output velocity sensor is mounted to the outside of the casing and is arranged to detect the velocity of rotation of the second mounting arrangement and/or output shaft.

The outputs of the velocity sensors enable accurate control of the primary gearbox, hydraulic pumps and hydraulic motor. The present disclosure further provides such a input velocity sensors mounted to prior art hydrostatic gearboxes.

The present invention further provides a road cleaning machine comprising the aforementioned powertrain.

The present invention further provides a method of manufacture of the hydrostatic gearbox of the powertrain of any one of the preceding claims, the method comprising the steps of: separately forming the first and second sections without the plurality of passageways; fastening the first and second sections together at their edges; machining the plurality of passageways through the walls; separating the first and second sections; mounting the shafts in the first section; and fastening the first and second sections together at their edges.

A joint across the passageways can result in the casing splitting apart when the shafts are at high torques due to the high forces transmitted by the shafts orthogonally to their axes of rotation. As a result, such a joint would not be used in a high torque application as in a road cleaning machine. The inventors were therefore surprised to find that by machining the passageways whilst the first and second sections are fastened together, it was possible to form the passageways with sufficiently high tolerances that breaking apart can be prevented. However, as it requires fastening the first and second sections together twice, this solution was contrary to the common conception that cost and assembly time reductions result from fewer manufacturing steps.

The present invention also provides a hydrostatic gearbox for use in the aforementioned powertrain.

Furthermore, the present invention provides a novel hydraulic fluid filter housing, which can be mounted over passageways in which shafts are mounted of prior art hydrostatic gearboxes.

By way of example only, embodiments of a powertrain for a road cleaning vehicle are now described with reference to, and as show in, the accompanying drawings, in which.

The present invention is generally directed towards a powertrain for a road sweeping vehicle comprising a hydrostatic gearbox. The casing of the hydrostatic gearbox is split across the passageways through the casing in which the input and output shafts are mounted. The input shaft and gear mounted thereon are formed integrally/unitarily.

A known powertrain 30 for a road sweeping machine 10 is illustrated in FIG. 2 and comprises a power unit 31 operably connected (i.e. arranged to be able to provide power to) a primary gearbox 32. The power unit 31 is commonly a diesel or compressed natural gas internal combustion engine, although it may of any other suitable type, such as an electric motor, any other type of internal combustion engine or a micro turbine. The output of the primary gearbox 32 is provided in the form of an input propshaft 33. The primary gearbox 32 is operable to rotatably drive an input propshaft 33 and may be either manual or automatic.

The input propshaft 33 is connected to the input of a hydrostatic gearbox 34 via a first mounting arrangement 35. A drivetrain 36 is connected to and operable to be driven by the output of the hydrostatic gearbox 34 and is operable to move the road cleaning machine 10 along terrain. The drivetrain 36 comprises an output propshaft 37 which is connected to the output of the hydrostatic gearbox 34 via a second mounting arrangement 38 and is operable to drive the rear wheels 12 via a differential 39 and rear axle 40.

First and second hydraulic pumps 41, 42 are connected to an output of the hydrostatic gearbox 34 and a hydraulic motor 43 is attached to an input of the hydrostatic gearbox 34. The first hydraulic pumps 41, second hydraulic pump 42 and/or hydraulic motor 43 may be variable displacement hydraulic machines. The first hydraulic pump 41 is fluidly connected to the hydraulic motor 43 via a first hydraulic circuit 44. The second hydraulic pump 42 is operable to provide power to the work tools of the road cleaning machine 10 via a second hydraulic circuit 45. Further hydraulic pumps may be connected to the output of the hydrostatic gearbox 34, for example in series with the first or second hydraulic pump 41, 42, to provide power to other hydraulic circuits for the control of different work tools of the road cleaning machine 10.

In the transit mode the hydrostatic gearbox 34 is arranged such that power is transmitted directly from the input propshaft 33 to the output propshaft 37, such that the wheels 12 are driven and the machine 10 moves along the terrain. In the work mode, the hydrostatic gearbox 34 is arranged such that power is transmitted from the input propshaft 33 to the first and second hydraulic pumps 41, 42. The first hydraulic pump 41 drives the hydraulic motor 43, which drives the output propshaft 37 via the hydrostatic gearbox 34.

The powertrain 30 of the present invention comprises a hydrostatic gearbox 34 as illustrated in FIGS. 4 to 10. With reference to FIGS. 4 to 7, the hydrostatic gearbox 34 comprises a casing 50 having first and second sections 51, 52 and which, when the hydrostatic gearbox 34 is assembled, provides a sealed volume within it.

Although it may be arranged in other suitable orientations, the first section 51 normally forms the lower part of the casing 50 when the hydrostatic gearbox 34 is mounted in the powertrain 30. The references to "upwardly", "downwardly", "upper", "lower" and associated terms in the following description refer to the hydrostatic gearbox 34 in this orientation.

Figure 6:
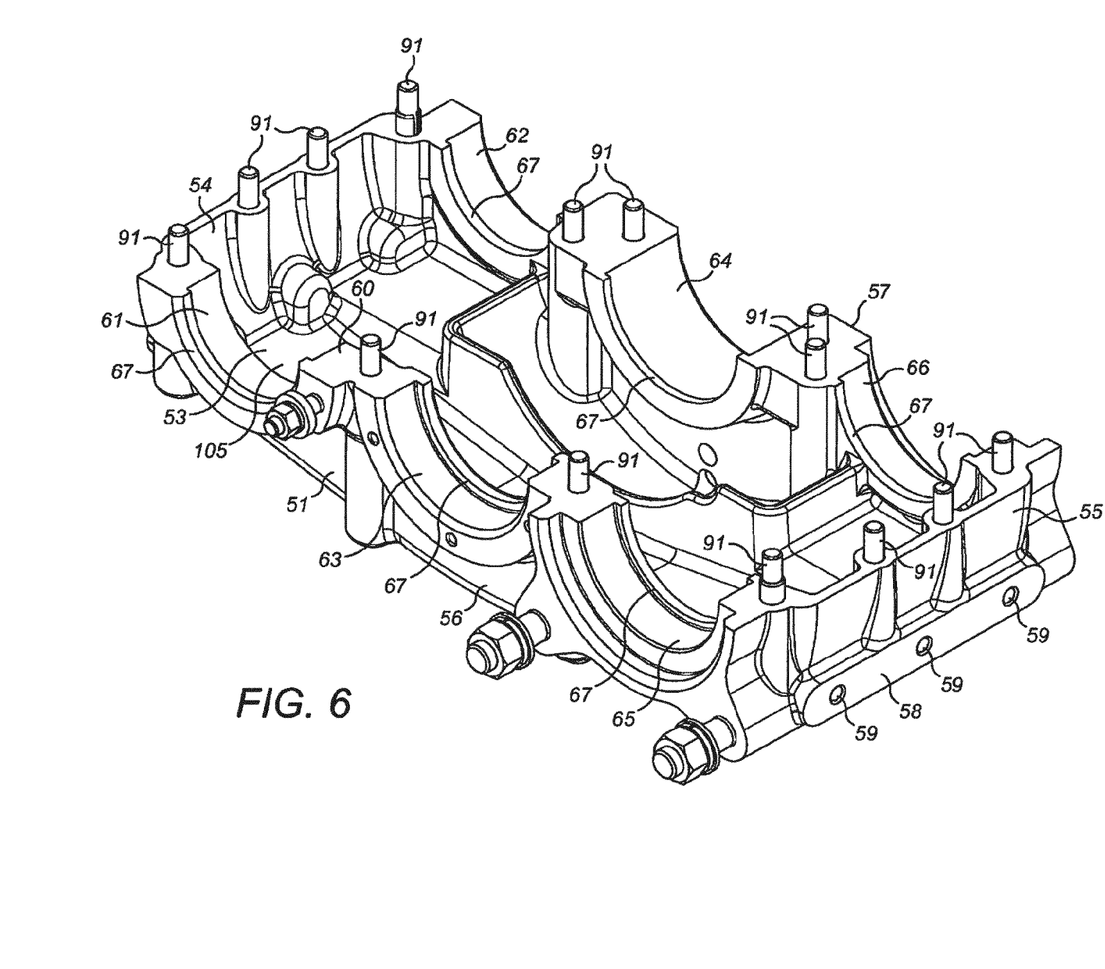
FIG. 6 is a perspective view of a first section of a casing of the hydrostatic gearbox of FIGS. 4 and 5.

As illustrated in FIG. 6, the first section 51 comprises a base 53 which is substantially rectangular in plan view. First and second side walls 54, 55 extend substantially upwardly from the shorter peripheries of the base 53 and first and second major walls 56, 57 extend substantially upwardly from the longer peripheries of the base 53. The side walls 54, 55 comprise lower chassis mounts 58 having threaded holes 59 for mounting the hydrostatic gearbox 34 via screws or bolts to a chassis of the road cleaning machine 10.

A planar top edge 60 of the first section 51 is formed from the top edges of the walls 54, 55, 56, 57. The first and second major walls 56, 57 each comprise a first outer recess 61, 62, a central recess 63, 64 and a second outer recess 65, 66 on the other side of the central recess 63, 64 to the first outer recess 61, 62. The recesses 61, 62, 63, 64, 65, 66 are semi-circular and extend downwardly from the top edge 60. Each recess 61, 62, 63, 64, 65, 66 comprises one or more lips 67 extending continuously around their inner faces.

Figure 7:
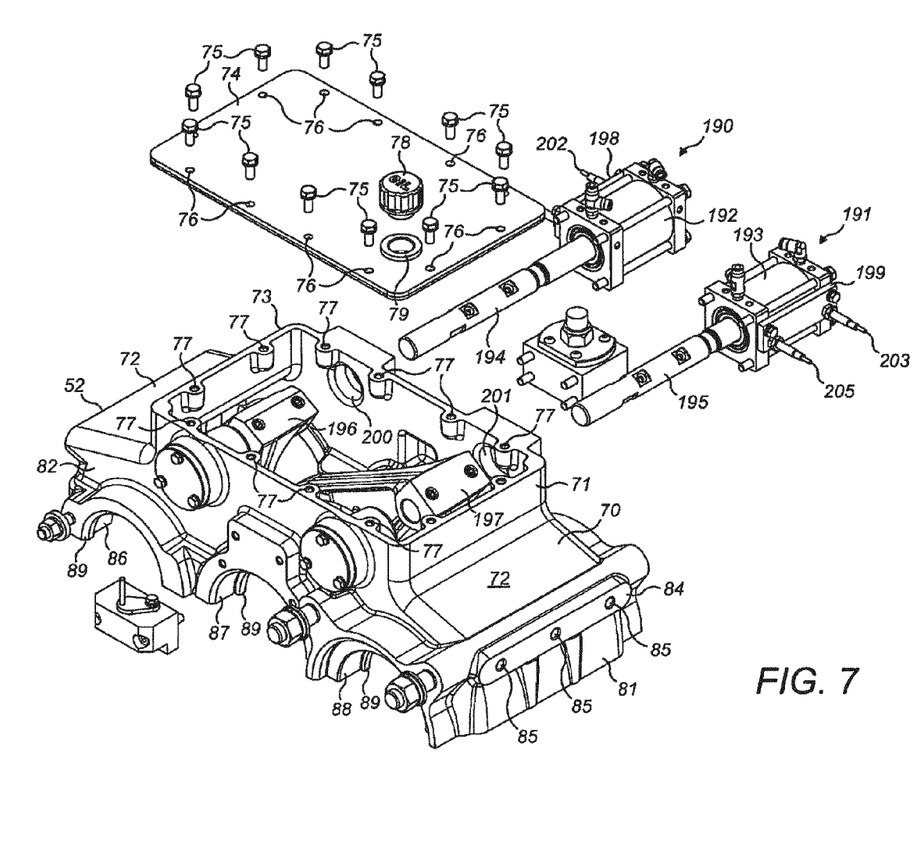
FIG. 7 is an exploded perspective view of a second section of a casing of the hydrostatic gearbox of FIGS. 4 and 5.

As illustrated in FIG. 7, the second section 52 is also substantially rectangular in plan view and comprises a top side 70. The top side 70 comprises a wall 71 upstanding from between two upper faces 72. The top of the wall 71 defines an opening 73 which, in use, is covered by a closure 74. The closure 74 seals the opening 73 and is attached to the wall 72 by fastening means, in this embodiment being screws 75 extending through holes 76 in the closure 74 into holes 77 in the wall 72. A removable screw-cap 78 and threaded hole is provided in the closure 74 to easily enable an operator to insert oil into the casing 50.

First and second side walls 80, 81 extend substantially downwardly from the shorter peripheries of the top side 70 and first and second major walls 82, 83 extend substantially downwardly from the longer peripheries of the top side 70. The first and second side walls 80, 81 comprise chassis mounts 84 having threaded holes 85 for mounting the hydrostatic gearbox 34 via screws or bolts to a chassis of the road cleaning machine 10.

A planar bottom edge (not shown) of the second section 52 is formed from a plurality of bottom edges of the walls 80, 81, 82, 83. The first and second major walls 82, 83 each comprise a first outer recess 86 a central recess 87 and a second outer recess 88 on the other side of the central recess 87 to the first outer recess 86. The recesses 86, 87, 88 are semi-circular and extend upwardly from the bottom edge. Each recess 86, 87, 88 comprises one or more lips 89 extending continuously around their inner faces.

The top and bottom edges 60 of the first and second sections 51, 52 are arranged such that in the assembled casing 50 they cooperate with one another to provide a sealed interface therebetween. When in the orientation shown in the figures, the casing 50 thus comprises a "horizontal split". Fastening means are provided to sealably attach the first and second sections 51, 52 together. In the present embodiment, the fastening means comprise a number of holes 90 extending through the walls 54, 55, 56, 57 of the first section 51 from the underside of the base 53 to the top edge 60. Screws 91 are inserted from the underside of the base 53 and engage with threaded holes (not shown) on the bottom edge of the second section 52. In addition to screwing the second section 52 to the first section 51, an adhesive and/or sealant may be provided between the top and bottom edges 60. In an alternative embodiment the holes 90 extend through the walls 80, 81, 82, 83 of the second section 52 from the outer face of the top side 70 to the bottom edge. The screws 91 are inserted from the top side 70 of the second section 52 and engage with threaded holes in the top edge of the first section 51.

Figure 4:
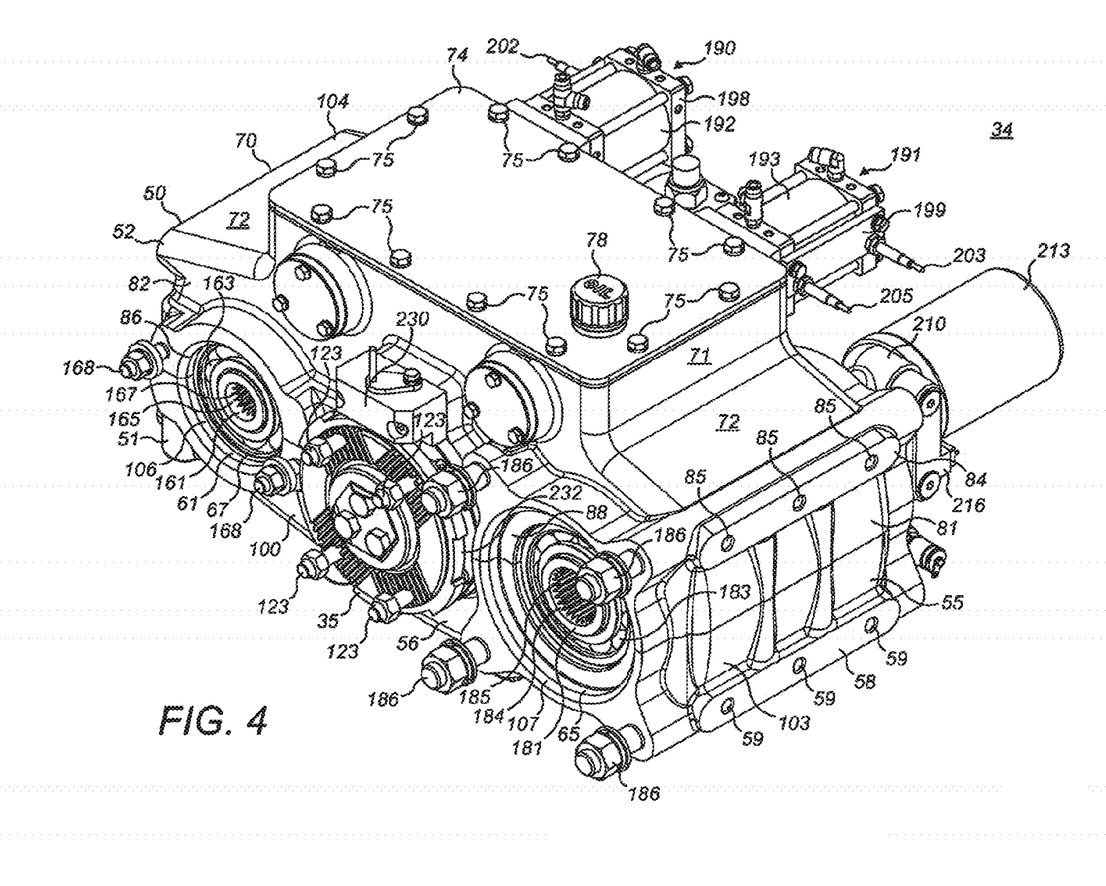
FIG. 4 is a perspective view of the front of a hydrostatic gearbox of the present invention.
Figure 5:
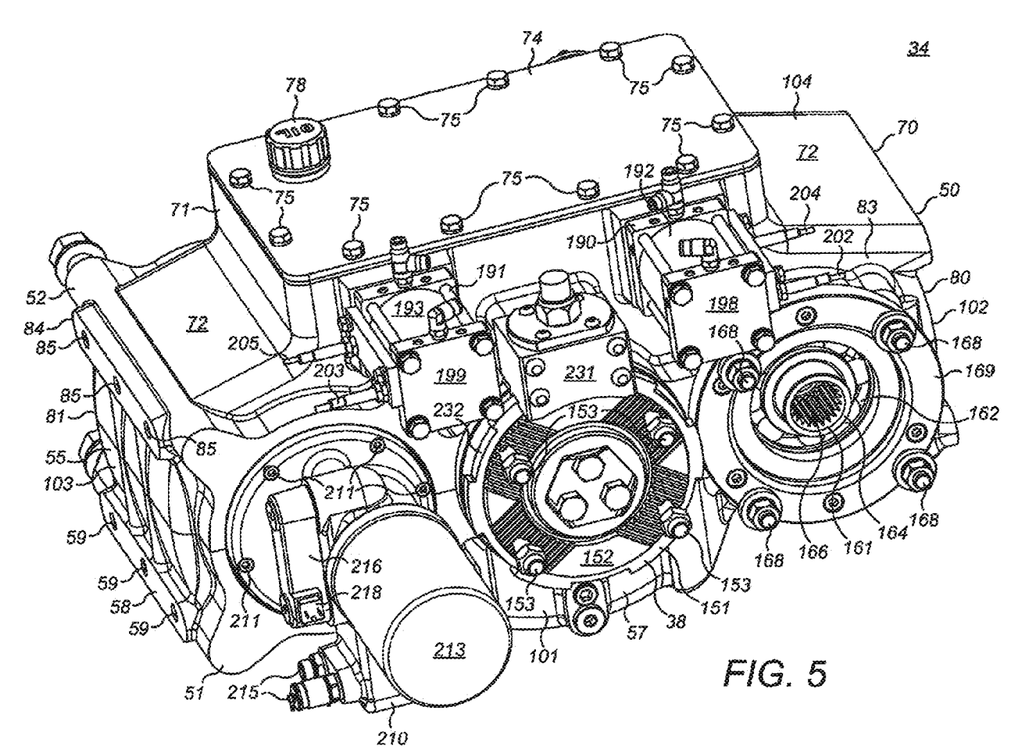
FIG. 5 is a perspective view of the rear of the hydrostatic gearbox of FIG. 4.

The assembled casing 50 therefore comprises opposing first and second major walls 100, 101, opposing first and second side walls 102, 103, a top side 104 and a base 105. Each recess 61, 62, 63, 64, 65, 66 of the first section 51 meets with the corresponding recess 86, 87, 88 of the second section 52 to form circular first outer passageways 106, central passageways and second outer passageways 107 in the first and second major walls 100, 101 of the casing 50 (the passageways 106, 107 are not all visible in the Figures). Thus the edges of the first and second sections 51, 52 are arranged to each form half of the periphery of each of the plurality of passageways 106, 107.

The centrelines through the passageways 106, 107 (i.e. centrelines extending parallel to the first and second side walls 102, 103) are in substantially the same plane as the plane of the top and bottom edges 60. Thus the casing 50 comprises a planar joint or split therethrough in the same plane as the centrelines of the passageways 106, 107. In alternative embodiments the passageways 106, 107 may be of another shape and the split may be in a different plane to the centreline of the passageways 106, 107. The centreline through each passageway 106, 107 is collinear with the centreline through the corresponding passageway 106, 107 in the other major wall 100, 101.

Figure 8:
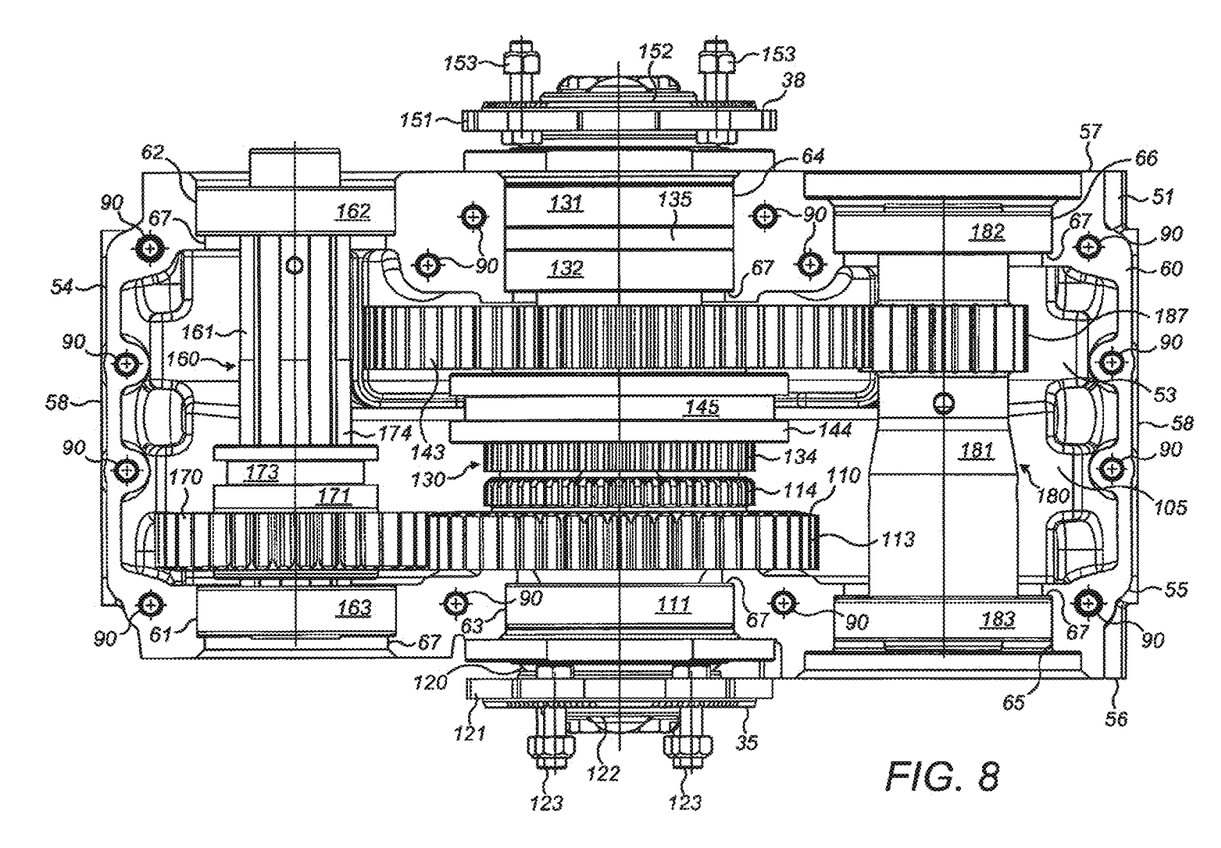
FIG. 8 is a plan view of the first section of FIG. 6 with shaft arrangements mounted therein.
Figure 9:
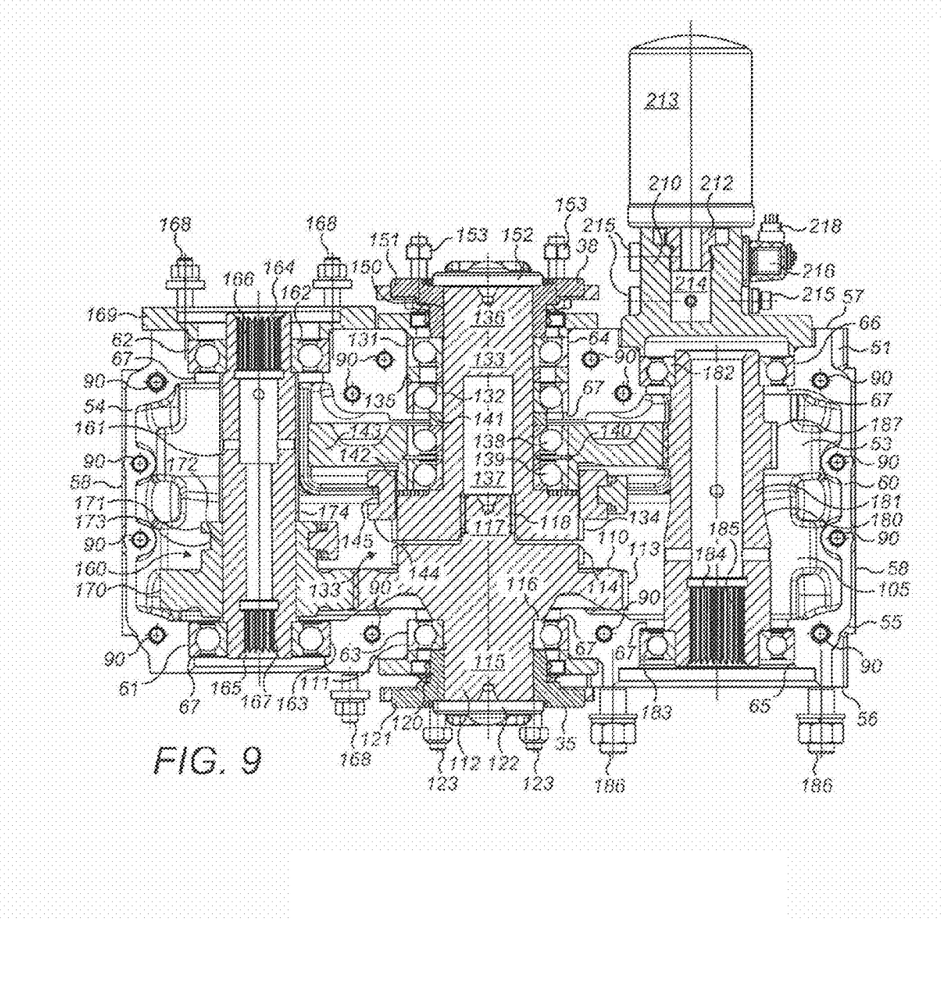
FIG. 9 is a cross-sectional view through the centrelines of the shaft arrangements shown in FIG. 8.

Each of a plurality of shaft arrangements 110, 130, 160, 180 is mounted in at least one of the passageways 106, 107. An input shaft arrangement 110 is mounted in the central passageway of the first major wall 100, an output shaft arrangement 130 is mounted in the central passageway of the second major wall 101, a pump drive shaft arrangement 160 is mounted in the first outer passageways 106 of the first and second major walls 100, 101 and a motor driven shaft arrangement 180 is mounted in the second outer passageways 107 of the first and second major walls 100, 101. The centrelines/axes about which the input and output shaft arrangements 110, 130 rotate are collinear/coaxial.

The input shaft arrangement 110 is mounted in a bearing 111 and comprises a unitary input shaft 112, first input gear 113 and second input gear 114. The bearing 111 is mounted in the central passageway of the first major wall 100 of the casing 50 and is held in place by the lips 67, 89. In this embodiment the bearing 111 is a deep groove ball bearing 111, but other suitable types of bearing 111 may be used. The input shaft 112 is rotatably mounted in the bearing 111 such that an outer portion 115 extends from the bearing 111 and out of the casing 50. The input shaft arrangement 110 comprises an integral lip 116 which rests against the bearing 111 to prevent the input shaft arrangement 110 from moving out of the casing 50. The outer portion 115 comprises an external spline onto which an internal spline of the first mounting arrangement 35 is mounted.

The first mounting arrangement 35 comprises a hollow cylinder 120 having a flange 121 at its outer end and having the internal spline around its inner surface. A plate 122 is attached to the flange 121 and comprises a plurality of bolts 123 for attachment to a corresponding mounting arrangement (not shown) connected to the input propshaft 33.

The first and second input gears 112, 113 are located within the casing 50, i.e. on the inner side of the bearing 111, and both extend from the input shaft 112 orthogonally to the axis of rotation of the input shaft 112. In this embodiment the first input gear 113 has a greater diameter than that of the second input gear 114 and the second input gear 114 is located adjacent to the first input gear 113. At the inner end of the input shaft arrangement 110, i.e. at the end furthest within the casing 50, an inner portion 117 of the input shaft 112 extends from the second input gear 114. A bearing 118 is mounted to the inner portion 117. In this embodiment the bearing 118 is a needle bearing 118, although may be of any other suitable type.

The output shaft arrangement 130 is mounted in two bearings 131, 132 and comprises a unitary output shaft 133 and first output gear 134. The bearings 131, 132 are mounted in the central passageway of the second major wall 101 of the casing 50 and are held in place via the lips 67, 89 in the central passageway. A spacer element 135 is located between the two bearings 131, 132. In this embodiment the bearings 131, 132 are angular contact ball bearings 131, 132, but other suitable types of bearing 131, 132 may be used. The output shaft 133 is rotatably mounted in the bearings 131, 132 such that an outer portion 136 extends from the bearings 131, 132 and out of the casing 50. The outer portion 136 comprises an external spline onto which an internal spline of the second mounting arrangement 38 is mounted.

The second mounting arrangement 38 comprises a hollow cylinder 150 having a flange 151 at its outer end and having the internal spline around its inside surface. A plate 152 is attached to the flange 151 and comprises a plurality of bolts 153 for attachment to a corresponding mounting arrangement connected to the output propshaft 37.

The first output gear 134 is located at the inner end of the output shaft 133 and extends from the output shaft 133 orthogonally to the axis of rotation of the output shaft 133. A central bore 137 is formed in the face of the inner end of the output shaft 133 into which the inner portion 117 of the input shaft 112 extends. The needle bearing 118 provides support therebetween, but allows the input and output shafts 112, 133 to rotate independently of one another.

Within the casing 50 a further two bearings 138, 139 are mounted to the output shaft 133 adjacent to the first output gear 134, being separated from one another and from the other bearings 131, 132 in the central passageway by spacer elements 140, 141. Integrally formed second and third output gears 142, 143 are mounted to these further bearings 138, 139. The second output gear 142 is arranged adjacent to the first output gear 134. The third output gear 143 is arranged between the casing 50 and the second output gear 142 and is of a greater diameter than the second output gear 142.

The second input gear 114, first output gear 134 and second output gear 142 are each of the same diameter. A first clutch 144 is arranged to connect the first output gear 134 either to the second output gear 142 or to the second input gear 114. In this embodiment the first clutch 144 is a ring-shaped dog clutch 144, although it may be any other suitable type of clutch 144. The first clutch 144 is arranged to slide between first and second positions. In the first position teeth on the internal surface of the first clutch 144 engage with teeth on the first output gear 134 and teeth of the second output gear 142. In the second position the teeth on the internal surface of the first clutch 144 engage with teeth on the first output gear 134 and teeth of the second input gear 114. The outer face of the first clutch 144 comprises a selector engagement groove 145 extending continuously around it.

The pump drive shaft arrangement 160 comprises a pump drive shaft 161 mounted in a bearing 162, 163 in each of the first outer passageways 106 of the first and second major walls 100, 101 of the casing 50. The bearings 162, 163 are deep groove ball bearings 162, 163, but may be any other suitable type of bearing 162, 163. At both ends of the pump drive shaft 161 a bore 164, 165 extends within the pump drive shaft 161 along its axis of rotation. An internal spline 166, 167 is provided about the inner face of each bore 164, 165. Shafts of the first and second hydraulic pumps 41, 42 comprise external splines which mate with the internal splines 166, 167 of the pump drive shaft 161 such that they rotate therewith. The first and second hydraulic pumps 41, 42 are mounted over the first outer passageways 106 via fastening means to form a seal therewith. In this embodiment the fastening means comprises bolts 168 and a mounting plate 169 over the first outer passageway of the second major wall 101.

The pump drive shaft arrangement 160 further comprises a pump drive gear 170 formed integrally with a second clutch 171 and having a bore 172 therethrough. The second clutch 171 is a ring-shaped dog-clutch 171, although may be any other suitable type of clutch 171. The second clutch 171 extends from the inner side of pump drive gear 170 and its outer face comprises a selector engagement groove 173 extending continuously around it.

The inner surface of the bore 172 comprises engagement means for slidably engaging with engagement means on the outer surface of the pump drive shaft 161. In the present embodiment the engagement means comprise relatively wide-grooved interengaging splines 174, such as straight sided splines, but may be of any suitable type. The engagement means ensure that the pump drive gear 170 (and thus second clutch 171) rotates synchronously with the pump drive shaft 161 and enables the pump drive gear 170 to slide along the pump drive shaft 161 along its axis of rotation between first and second positions. When in a first position the pump drive gear 170, and thus pump drive arrangement 160, does not interlock with and is not rotatably driven by the first input gear 113. When in a second position the pump drive gear 170, and thus pump drive arrangement 160, is arranged to interlock with and be rotatably driven by the first input gear 113.

The motor driven shaft arrangement 180 comprises a motor driven shaft 181 mounted in a bearing 182, 183 in each of the second outer passageways 107 of the first and second major walls 100, 101 of the casing 50. The bearings 182, 183 are deep groove ball bearings 182, 183, but may be any other suitable type of bearing 182, 183. At the first major wall 100 end of the motor driven shaft 181 a bore 184 extends within the motor driven shaft 181 along its axis of rotation. An internal spline 185 is provided about the inner face of the bore 184. A shaft of the hydraulic motor 43 comprises an external spline that mates with this internal spline 185 such that the hydraulic motor 43 can rotatably drive the motor driven shaft 181. The hydraulic motor 43 is sealably mounted over the second outer passageway 107 of the first major wall 100 using bolts 186.

A motor driven gear 187 is formed integrally with the motor driven shaft 181 and extends from the motor drive shaft 181 orthogonally to its axis of rotation. The motor driven gear 187 comprises teeth which engage with teeth on the third output gear 143 such that when the motor driven shaft 181 rotates the third output gear 143 will rotate.

First and second selector arrangements 190, 191 are operable to move the first and second clutches 144, 171 between their first and second positions. Each selector arrangement 190, 191 comprises an actuator 192, 193, a piston rod 194, 195 and an arm 196, 197. The actuators 192, 193 are mounted in a housing 198, 199 on the outside of the second major wall 83 of the second section 52 of the casing 50. The piston rods 194, 195 extend from the actuators 192, 193 through bores 200, 201 in the second major wall 83 of the second section 52, across the inside of the casing 50 and are rotatably mounted in a bore (not shown) through the first major wall 82 of the second section 52.

The arms 196, 197 are fixed to the piston rods 194, 195 between the first and second major walls 82, 83 and extend downwards to the first and second clutches 144, 171. The arms 196, 197 comprise engagement means for connecting to the first and second clutches 144, 171 such that when the arms 196, 197 move between first and second positions the first and second clutches 144, 171 move between their first and second positions. In the present embodiment the arms 196, 197 comprise edges (not shown) which are semi-circular in shape and which fit into the selector engagement grooves 145, 173 of the first and second clutches 144, 171.

The actuators 192, 193 move the piston rods 194, 195 along axes parallel to the axes of rotation of the shafts 112, 133, 161, 181. The actuators 192, 193 are actuated via a fluid, such as compressed gas or air, supplied from the road cleaning machine 10. When moved, the piston rods 194, 195 move the first and second clutches 144, 171 between their first and second positions. Each piston rod 194, 195 comprises a magnetic element (not shown) which can be detected by first and second reed switches 202, 203, 204, 205 attached to the housings 198, 199. The reed switches 202, 203, 204, 205 are actuated when the magnetic element passes adjacent to them. The output from the reed switches 202, 203, 204, 205 is connected to a controller, which uses the output to determine the position of the first and second clutches 144, 171. The controller subsequently controls the actuators 192, 193 to ensure that the first and second clutches 144, 171 are in the correct position. The reed switches 202, 203, 204, 205 may be any other type of magnetic field sensor.

A hydraulic fluid filter housing 210 is mounted to the casing 50 over the second outer passageway through the second major wall 101 of the casing 50. The filter housing 210 is fixed to casing 50 via screws 211 screwed through holes in the filter housing 210 into threaded holes in the casing 50. The hydraulic fluid filter housing 210 comprises a filter mount 212 for cooperation with a hydraulic fluid filter 213, a first passageway 214 within the housing 210 and conduit mounts 215. Conduits (not shown) are connected to the conduit mounts 215 and direct hydraulic fluid, in particular oil, to/from the first and/or second hydraulic circuits 44, 45. The first passageway 214 communicates hydraulic fluid from one of the conduit mounts 215 through the filter 213 to another one of the conduit mounts 215.

An oil level sensor 216 is mounted to the hydraulic fluid filter housing 210 and is arranged to detect the oil level in the casing 50. A second passageway 217 is formed within the housing 210 and communicates with the internal volume of the casing 50 via an opening formed in an inner face of the housing 210 over the second outer passageway of the second major wall 101. Oil flowing through the second passageway 217 communicates with the oil level sensor 216. The oil level sensor 216 is a column type level indicator which is exposed on three sides to enable easy viewing by an operator. The oil level sensor 216 is also connected via electrical connector 218 an electric circuit to the dashboard of the work machine 10 for an operator to check the oil level whilst within the operator control station 13.

An input velocity sensor 230 is mounted to the outside of the first major wall 82 of the second section 52 of the casing 50 above the first mounting arrangement 35. The input velocity sensor 230 is arranged to detect the velocity of rotation of the input shaft 112 by determining the velocity of rotation of the first mounting arrangement 35.

An output velocity sensor 231 is mounted to the outside of the second major wall 83 of the second section 52 of the casing 50 above the second mounting arrangement 38. The output velocity sensor 231 is arranged to detect the velocity of rotation of the output shaft 133 by determining the rotational velocity of the second mounting arrangement 38.

The input and output velocity sensors 230, 231 comprise proximity sensors mounted over the flanges 121, 151 of the first and second mounting arrangements 35, 38. The flanges 121, 151 comprise indentations 232 around their peripheries. The proximity sensors detect the reduction in diameter of the flanges 121, 151 at the indentations 232 as the first and second mounting arrangements 35, 38 rotate. The sensors provide an output to a controller, which determines the rotational speed from parameters such as the flange 121, 151 radii, the number of indentations 222, the depth of the indentations 232 and/or the arc lengths of the indentations 232.

The hydrostatic gearbox 34 is produced as follows. Initially, the first and second sections 51, 52 are formed separately. They may be formed from cast iron via casting. They are formed without the first outer passageways 106, central passageways or second outer passageways 107. The top and bottom edges 60 are then machined to a high tolerance. Subsequently, the first and second sections 51, 52 are attached to one another along their top and bottom edges 60 via the fastening means, which in the embodiment shown are the holes 90 of the first section 51, threaded holes of the second section 52 and screws 91.

The first outer passageways 106, central passageways and second outer passageways 107 are subsequently machined into the first and second major walls 100, 101 of the casing 50. This ensures that the first outer recesses, 61, 62, 86, central recesses 63, 64, 87 and second outer recesses 65, 66, 88 are formed sufficiently accurately such that they do not result in a more seal of the first and second sections 51, 52. In a particular embodiment of the production process a fixing arrangement is provided to hold the casing 50 in place. The fixing arrangement is placed in a CNC machine, which subsequently machines the passageways 106, 107.

The first and second sections 51, 52 are then unfastened from one another. The input shaft arrangement 110, output shaft arrangement 130, pump drive shaft arrangement 160 and motor driven shaft arrangement 180 are subsequently mounted in the recesses 61, 62, 63, 64 65, 66 of the first section 51. The second section 52 is then fastened to the first section 51 via the fastening means, preferably also including the adhesive and/or sealant in between the top and bottom edges 60 of the first and second sections 51, 52. The first and second selector arrangements 190, 191 and input and output velocity sensors 230, 231 can be mounted to the second section 52 either before or after the first and second sections 51, 52 are fastened together. After their fastening together, the hydraulic fluid filter housing 210 is mounted over the second central passageway of the second major wall 101.

Figure 3:
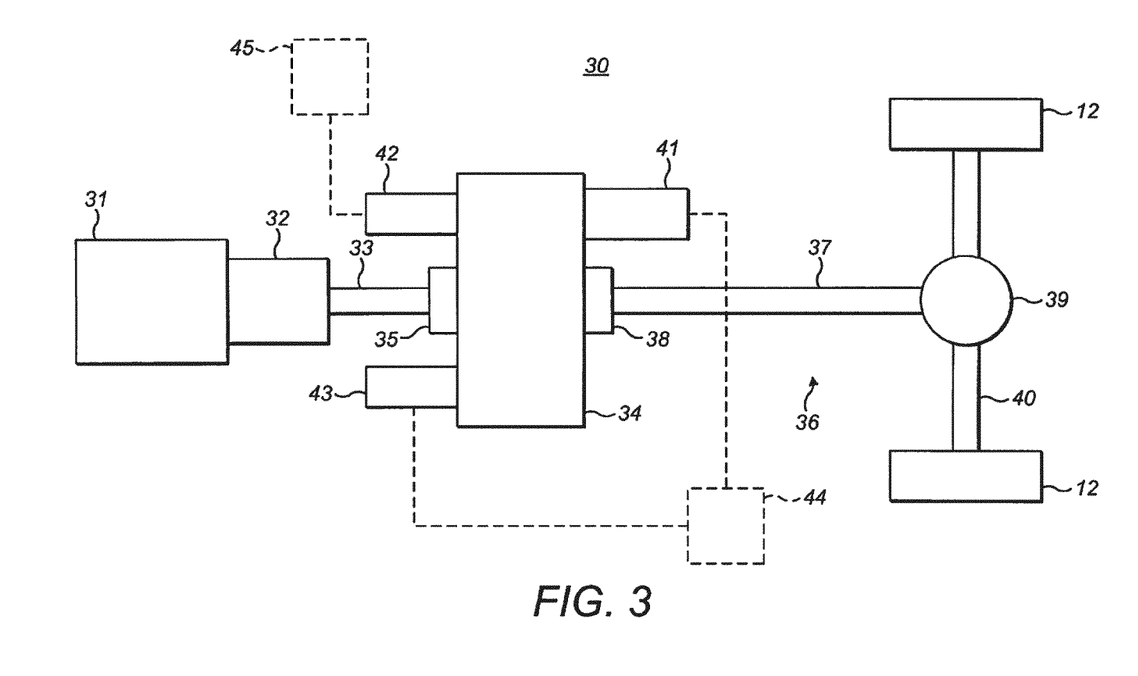
FIG. 3 is a schematic view of a powertrain of the present invention.

The hydrostatic gearbox 34 is then mounted in the powertrain 30 as known in the art. In particular, the input and output propshafts 33, 37, first and second hydraulic pumps 41, 42 and hydraulic motor 43 are mounted/operably connected to the hydraulic gearbox 34. The first and second hydraulic circuits are connected to the first and second hydraulic pumps 41, 42, hydraulic motor 43 and hydraulic fluid filter housing 210.

The operation of the powertrain 30 during use of the road cleaning machine 10 will now be described. In the transit mode the power unit 31 provides power to the input propshaft 33 via the primary gearbox 32. The primary gearbox 32 is operated to control the rotational velocity of the input propshaft 33, either manually by an operator from the operator control station 13 or automatically. The output propshaft 37 rotates the input shaft 112 of the hydrostatic gearbox 34 via the first mounting arrangement 35. The first selector arrangement 190 moves the first clutch 144 to its first position and the second selector arrangement 191 moves the second clutch 171 to it is in its first position. Thus the input shaft arrangement 110 is operably connected to the output shaft arrangement 130, but not to the pump drive shaft arrangement 160. The output shaft 133 provides rotational power to the output propshaft 37, which provides power to the differential 39, rear axle 40 and wheels 12. The road cleaning machine 10 thereby moves along the terrain on which it stands, the speed being controlled by power output of the power unit 31 and by the gear selection of the primary gearbox 32.

In the work mode the power is transmitted from the power unit 31 to the input shaft 112 of the hydrostatic gearbox 34 in a similar manner to that in the transit mode.

However, the power unit 31 is preferably run at a fixed speed, which is preferably at its most efficient power output. The primary gearbox 32 is arranged to have a 1:1 ratio of rotational velocity between its input from the power unit 31 and the input propshaft 33. The input velocity sensor 230 detects the velocity of rotation of the first mounting arrangement 35, confirming whether the primary gearbox is in a 1:1 ratio. If not at a 1:1 ratio, the operator is informed and/or the primary gearbox 32 is changed to provide a 1:1 ratio.

The first selector arrangement 190 moves the first clutch 144 to its second position and the second selector arrangement 191 moves the second clutch 171 to it is in its second position. Thus the input shaft arrangement 110 is operably connected to the pump drive shaft arrangement 160, but not to the output shaft arrangement 130. The pump drive shaft arrangement 160 rotates and powers the first and second hydraulic pumps 41, 42, which in turn move hydraulic fluid within the first and second hydraulic circuits 44, 45. The cleaning tools are operated utilising power from the second hydraulic circuit 45. The first hydraulic circuit 44 provides power to the hydraulic motor 43, which rotates the motor driven shaft 181.

The motor driven shaft 181 rotates the third output gear 143, which is connected to the output shaft 133 via the first clutch 144, first output gear 134 and second output gear 142. The output shaft 133 thereby provides power to the wheels 12 as in the transit mode. The speed of the road cleaning machine 10 is detected by the output velocity sensor 231, the output of which is used to control the speed via the pumps 41, 42 and motor 43. Such control is either via the adjustment of variable elements within the pumps 41, 42 and/or motor 43, or via a valve arrangement within the first hydraulic circuit 44. The work mode therefore provides infinitely variable stepless hydrostatic control of the speed of the road cleaning vehicle 10. For example, such control may be between approximately 0 and 40 kph.

There are various different embodiments falling within the scope of the present invention. For example, a compound gear arrangement may be provided in between the input shaft arrangement 110 and the output shaft arrangement 130 and/or pump drive arrangement 160. Such a gear arrangement may enable a different ratio off rotation between the input and output shafts 112, 133. Other shafts may also be included within the hydrostatic gearbox 34 to enable power to be provided to other components of the powertrain 30 and/or other components of the road cleaning machine 10.

In a further alternative, a single hydraulic pump is attached to the pump drive shaft arrangement 160 instead of first and second hydraulic pumps 41, 42. Hydraulic fluid is distributed from the single pump between the cleaning tools and hydraulic motor 43 via a valve arrangement in a hydraulic circuit. In yet a further alternative, further hydraulic pumps are mounted to the first and second hydraulic pumps 41, 42. These further hydraulic pumps are arranged to provide hydraulic fluid to different cleaning tools and components of the road cleaning machine 10.

A further selector arrangement and clutch may be provided to selectively engage the motor driven gear 187 with the third output gear 143 in a similar manner to that of second selector arrangement 191 and second clutch 171. In such an arrangement, the first input gear 113 may be continuously engaged with the pump drive gear 170.

In yet a further embodiment the hydraulic fluid filter housing 210 is not mounted to the casing 50 over the second outer passageway through the second major wall 101 of the casing 50. Instead, the motor driven shaft 181 comprises a second internal spline at the other end to the aforementioned internal spline 185. A second motor engages with the second internal spline and is driven by the first hydraulic circuit 44. The advantage of using two motors is that they can be smaller than a single motor whilst providing the same power input. Therefore, due to the additional space around the motors, the assembly of the powertrain 30 in the machine 10 is more straightforward.

The invention claimed is:

1. A powertrain for a road sweeping vehicle comprising:
    a power unit operably connected to a primary gearbox; and
    a hydrostatic gearbox comprising:
        a casing having an internal volume and comprising first and second sections and a plurality of passageways, wherein the first and second sections each comprise walls having edges, the first and second sections being fastened together at the edges, and each passageway extends through the walls and is defined by the edges of both the first and second sections;
        an input shaft having an integral gear extending orthogonally therefrom and having an outer portion extending outside of the internal volume of the casing;
        an output shaft selectively engageable with the input shaft;
        a pump drive shaft operable to be driven by the input shaft gear; and
        a motor driven shaft operable to drive the output shaft, wherein the shafts extend within the casing and are each mounted in one of the passageways,
    said powertrain further comprising:
        a first mounting arrangement connected to the output of the primary gearbox and located on the outer portion of the input shaft;
        a second mounting arrangement connected to a drivetrain and located on the output shaft;
        a hydraulic motor drivably connected to the motor driven shaft; and
        at least one hydraulic pump drivably connected to the pump drive shaft and hydraulically connected to one or more road cleaning tools and/or the hydraulic motor.

2. A powertrain as claimed in claim 1 wherein the edges of the first and second sections lie in the same plane as the axes about which the shafts rotate.

3. A powertrain as claimed in claim 1 wherein the shafts are each mounted in at least one bearing in at least one of the plurality of passageways.

4. A powertrain as claimed in claim 1 wherein a first hydraulic pump connected to the pump drive shaft is hydraulically connected to the hydraulic motor and a second hydraulic pump connected to the pump drive shaft is hydraulically connected to the one or more road cleaning tools.

5. A powertrain as claimed in claim 1 wherein the first mounting arrangement is located on an external spline of the input shaft portion extending from the inside of the casing.

6. A powertrain as claimed in claim 1 wherein:
    the output shaft has an integral gear extending orthogonally therefrom inside the casing and has an outer portion extending outside of the internal volume of the casing;
    the second mounting arrangement is mounted onto the output portion of the output shaft; and
    the motor driven shaft is operable to drive the output shaft gear.

7. A powertrain as claimed in claim 6 wherein the second mounting arrangement is located on an external spline of the outer portion of the output shaft.

8. A powertrain as claimed in claim 1 wherein the hydraulic motor and/or at least one hydraulic pump are located on internal splines of the motor driven shaft and/or the pump drive shaft.

9. A powertrain as claimed in claim 1 wherein the hydrostatic gearbox comprises a first gear selector arrangement for selectively engaging the input and output shafts.

10. A powertrain as claimed in claim 9 wherein the first gear selector comprises:
    an actuator mounted to the outside of the casing;
    a piston rod extending into the casing from the actuators; and
    a selector arm connected to the piston rods and engaged with a first clutch,
    wherein the first clutch is arranged to selectively engage the input and output shafts together.

11. A powertrain as claimed in claim 1 wherein the hydrostatic gearbox comprises a second gear selector for selectively engaging the pump drive shaft with the input shaft gear.

12. A powertrain as claimed in 11 wherein the second gear selector comprises:
    an actuator mounted to the outside of the casing;
    a piston rod extending into the casing from the actuators; and
    a selector arm connected to the piston rods and engaged with a second clutch,
    wherein the second clutch is arranged to selectively engage the input and pump drive shafts together.

13. A powertrain as claimed in claim 12 wherein the first and/or second gear selector arrangements each comprise a first and a second magnetic field sensor and the piston rod comprise a magnetic element, the first and second magnetic field sensors being arranged to detect the movement of the magnetic element such that the position of the piston rod(s) can be determined.

14. A powertrain as claimed in claim 1 wherein the hydrostatic gearbox comprises a hydraulic fluid filter housing mounted to the casing and arranged to cooperate with a hydraulic fluid filter, such that hydraulic fluid circulates between the filter and at least one hydraulic circuit to which the at least one hydraulic pumps are fluidly connected.

15. A powertrain as claimed in claim 14 wherein the hydraulic fluid filter housing further comprises an oil passageway in fluid communication with the internal volume of the casing and an oil level sensor.

16. A powertrain as claimed in claim 15 wherein the hydraulic fluid filter housing is mounted over one of the passageways in which a shaft is mounted such that oil is communicated through that passageway from within the casing to the oil level sensor.

17. A powertrain as claimed in claim 1 wherein an input velocity sensor is mounted to the outside of the casing and is arranged to detect the velocity of rotation of the first mounting arrangement and/or input shaft.

18. A powertrain as claimed in claim 1 wherein an output velocity sensor is mounted to the outside of the casing and is arranged to detect the velocity of rotation of the second mounting arrangement and/or output shaft.

19. A road cleaning machine comprising the powertrain of claim 1.

20. A method of manufacture of the hydrostatic gearbox of the powertrain of claim 1, the method comprising the steps of:
- separately forming the first and second sections without the plurality of passageways;
- fastening the first and second sections together at their edges;
- machining the plurality of passageways through the walls;
- separating the first and second sections;
- mounting the shafts in the first section; and
- fastening the first and second sections together at their edges.

* * * * *